United States Patent Office 3,185,372
Patented May 25, 1965

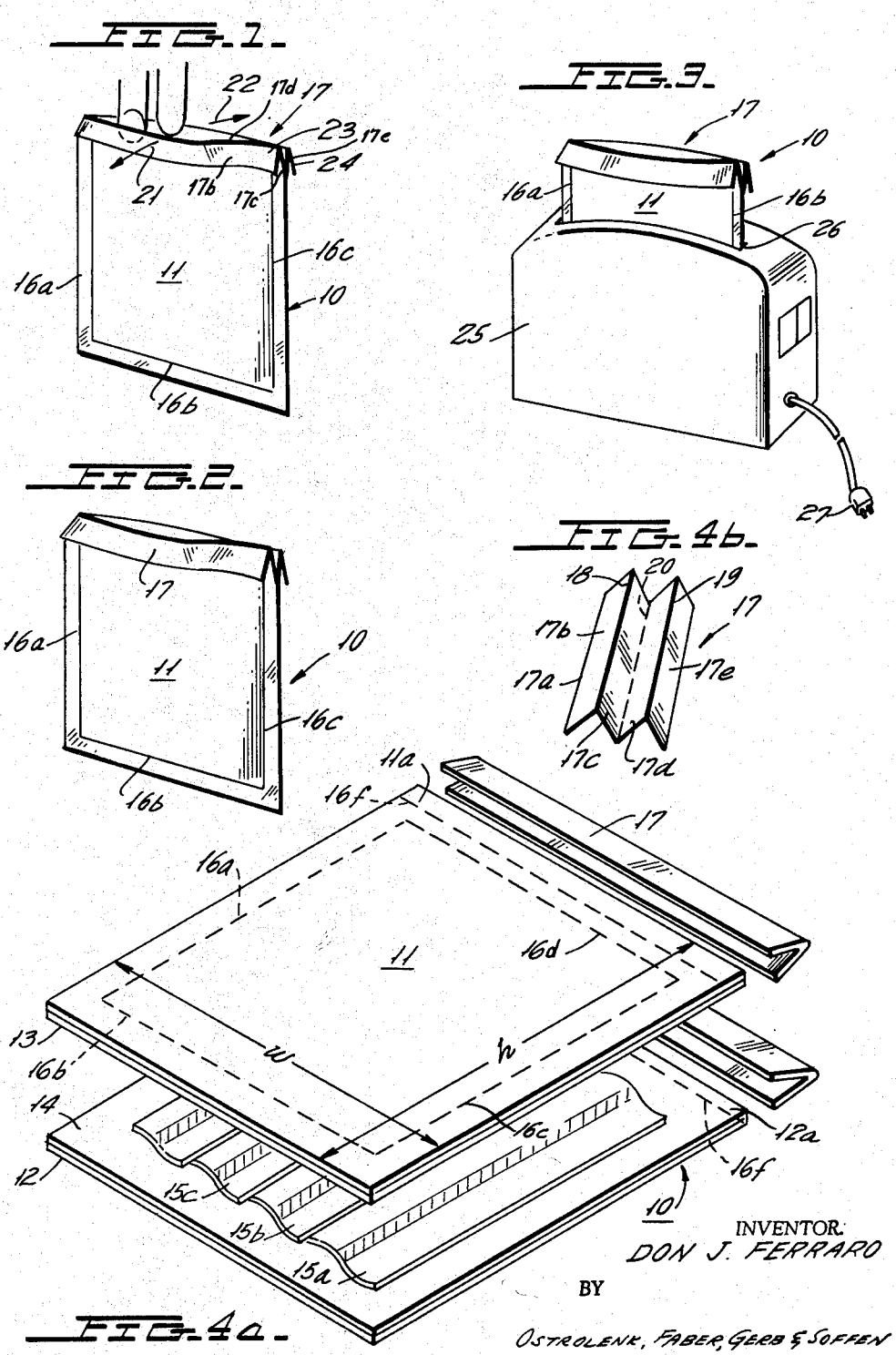

3,185,372
FOIL FOOD CONTAINER
Don John Ferraro, Lake Shore Drive, Mahopac, N.Y.
Filed Oct. 18, 1963, Ser. No. 317,345
5 Claims. (Cl. 229—3.5)

The instant invention relates to preprocessed foods and more particularly to a package for preprocessed foods such as, for example, pre-cooked bacon, wherein the package is so designed as to be readily insertable into a toaster for heating the package contents to a temperature suitable for serving.

Present day food preparation techniques lean heavily toward the simplification of the preparation of meals by the user, such as, for example, the housewife. In order to lighten the burden of preparation of meals, various techniques have been developed for the preparation of foods so as to simplify and shorten the cooking and serving activities performed by the housewife. As an example of the above, various foods are prepared in instant form, such as, for example, instant coffee, instant tea, frozen foods, and so forth, which prepared foodstuffs considerably diminish the amount of time required by the user for the preparation of a meal.

The instant invention comprises a novel arrangement for packaging certain foodstuffs, such as meats, which package is readily insertible into a toaster for heating or cooking the contents thereof quickly and easily, thereby substantially diminishing the preparation time of the meal, as well as substantially diminishing the number of utensils previously required for the preparation of such foodstuffs.

One manner in which the novel package of the instant invention may be employed is that of packaging bacon which has been pre-cooked to remove a substantial amount of the fats normally present in raw bacon. The pre-cooked bacon strips are placed in the package, which has dimensions suitable for insertion into a toaster in which the bacon may then be heated to the desired temperature for serving thereof. The package of the instant invention is normally comprised of a metallic foil which is sealed about its marginal edges for suitable preservation of the contents thereof. Insertion of such a coated metal foil package into a toaster may, however, cause a short-circuit condition or fire with the heating coils of the toaster if the foil package comes into contact with the heating elements. If such a short-circuit condition occurs at the time that the user is inserting the package into the toaster, there is danger of electrocution.

In addition to the above, although the bacon provided within the package is pre-cooked, there is nevertheless a certain amount of moisture and/or fat still contained within the package during the heating operation within the toaster. The moisture and/or fat contained within the sealed package is caused to expand, which may either burst a seam along the marginal edge of the package, or may cause a fracture in the surface of the foil package, creating the possibility of moisture and/or fat to seep into the bottom of the toaster, creating a condition which may serve to shorten the life of the toaster, as well as creating a poor sanitary condition.

The above disadvantages are overcome by the package of the instant invention, while at the same time providing all of the advantageous features of being readily insertable into a toaster and being sufficiently receptive to the heat from the toaster to suitably heat the contents thereof.

The instant invention is comprised of a metal foil package, having first and second sheets of coated metal foil which are cut to dimensions suitable for insertion into any standard toaster. First and second sanitary sheets of mylar nylon or other suitable material are positioned against the inner surfaces of the foil sheets, between which sheets are sandwiched the pre-cooked bacon strips. Strips are arranged between the two sanitary sheets in shingle fashion, with the edges of adjacent bacon strips overlapping one another. The bacon strips are so positioned between the first and second foil sheets so as to provide adequate margins about the four sides of the foil sheets. The package is then suitably heat and/or pressure sealed along all four margins, with the first and second sanitary sheets being sandwiched between the foil sides and with the bacon being sandwiched between the first and second sanitary sheets. The sanitary sheets are of dimensions which are substantially equal to the foil sides of the package.

A fourth side of the package is provided with a header member formed of a suitable non-conductive material, with the header means substantially covering the first and second foil sides along one edge thereof. The header means is comprised of two separate elements which when pulled apart, cause the foil package to separate along the sealed margin adjacent the header means, thus opening the package. The header means is provided along the top edge of the package, which is adapted to be gripped by the fingers for insertion into a toaster after the completion of the opening operation along the sealed margin. Since the header means is formed of an insulating material, insertion of the package into the toaster places the user under no danger whatsoever since if any short circuit condition does exist, the header means suitably insulates the user from the conductor foil package. With the top marginal seal having been opened, the heating operation which may cause any moisture and/or fats contained within the package to undergo expansion, will not cause any fracture of the package along the remaining marginal sealed edges since the opened upper end permits the escape of any expanded gases within the package through the top end of the package. This thereby alleviates the problem of any fracture of the package which might lead to a collection of water and/or heated fats in the bottom of the toaster.

In addition to the above, the outer surfaces of the first and second foil sheets are coated with a suitable non-conductive material, such as an epoxy or an epoxy base material, which acts to insulate the metal foil package from the heating coils of the toaster. The coating has no appreciable effect on the heating capacity of the package so that there is no noticeable increase in the time required for heating the contents of the package. The edges of the package may also be coated by a dipping operation for insulation thereof.

Whereas the above description relates to the manner of packaging bacon it should be understood that other pre-cooked meats and uncooked meats as well, may be placed within the package for use in a toaster. For example, the pre-cooked bacon may be substituted by pre-cooked corn-beef, pastrami or bologna slices as well as uncooked slices of the above, which are arranged in the package in the manner similar to that in which the bacon is arranged so as to be heated within the toaster.

It is therefore one object of the instant invention to provide a novel package for foods, such as sliced meats or other food products and the like, which package is designed for insertion into its toaster to heat the contents thereof.

Another object of the instant invention is to provide a novel package for pre-sliced meats, such as bacon and the like, which package provides means for isolating the user from the metal foil sides of the package to electrically isolate the user from the toaster-heating coils.

Another object of the instant invention is to provide a novel foil package for sliced foods, such as bacon and the like, which is readily insertable into a toaster and is provided with novel means to prevent the release of water and/or fats which may be contained within the package into the toaster.

Still another object of the instant invention is to provide a novel foil package for sliced foods, such as bacon and the like, which is designed for insertion into a toaster and which is provided with novel means which serves the dual function of electrically isolating the user from the live elements of the toaster and to permit the release of expanding gases which may be contained within the package, thus preventing the fracture of the package within the toaster to further prevent the collection of water and/or fats in the bottom of the toaster.

Still another object of the instant invention is to provide a novel foil package for sliced foods, such as bacon and the like, which is insertible into a toaster wherein a novel coating is provided to electrically isolate the foil sides of the package from the live elements of the toaster.

These and other objects will become apparent when reading the accompanying description and drawings in which:

FIGURES 1–3 are perspective drawings showing the manner of use of the package of the instant invention.

FIGURE 4a shows an exploded view of the package of the instant invention.

FIGURE 4b is a perspective view of the header means of FIGURE 4a, showing the header means in greater detail.

Referring now to the drawings, FIGURES 4a and 4b show the package 10, which is comprised of first and second rectangular sheets of metal foil 11 and 12. The width of each sheet of foil is approximately 4½″ while the length of each sheet is approximately 7½″. These dimensions have been chosen to suitably adapt the package for use in a toaster.

Each sheet of metallic foil 11 and 12 has laminated thereto a nylon sheet 13 and 14 respectively, which nylon sheets are of dimensions which are substantially identical to the dimensions of foil sheets 11 and 12. Whereas the sheets 13 and 14 are shown laminated to the foil sides 11 and 12, it should be understood that the lamination process while facilitating the automatic packaging operation, is not required, since the package will effectively provide substantially the same characteristics in the absence of the laminating process, as in the case where nylon, mylar or other material sheets 13 and 14 are laminated to the foil sheets 11 and 12.

The nylon sheets serve the function of providing a sanitary enclosure for the foodstuffs to be contained within the package. While sheets formed of nylon are preferred, it should be understood that any other suitable material may be employed.

The lower lamination, comprised of foil sheet 12 and sanitary sheet 14, has positioned thereon a plurality of bacon strips, such as for example, the bacon strips 15a–15c, exposed in the view of FIGURE 4a. The strips are so positioned upon the surface of sanitary sheet 14 that the adjacent long sides of the bacon are overlapped, which arrangement is known as a shingled arrangement. The bacon may also be placed in a side by side arrangement. Approximately four to five strips of bacon are deposited on the sanitary sheet 14. The bacon is so arranged as to lie within the region outlined by the dashed line 16a–16d, thus providing four marginal areas which surround the package.

The upper lamination comprised of sanitary sheet 13 and foil sheet 11 is then positioned directly upon the lower sheets 12 and 14 and a heat and/or pressure sealing operation is performed so as to adequately seal the two laminations to one another in the marginal area between the dashed outline 16a–16d and the edges of the sheets 11–14. The sealing operation, however, is not performed in the marginal area lying between the dashed line 16f and the upper edges 11a and 12a of foil sheets 11 and 12 respectively, so that these sheets are free to be separated slightly from one another along these marginal edges.

A header means 17 is then positioned over the two laminations and secured thereto in a manner to be more fully described. The header means 17, which can best be seen in FIGURE 4b, is formed from a substantially flat sheet 17a of non-conductive material, such as, paper, thin cardboard and the like, which sheet 17a is creased along the line 20 so as to form a substantially double U-shaped end profile. The header 17a of FIGURE 4b which is folded in half and then in half again thus has four elongated substantially flat sides 17b–17e, each of which are substantially equal to one another in both dimensions and surface area. The header means 17 is so positioned relative to the package 10 of FIGURE 4a, such that the sides 17b and 17c are positioned to sandwich the marginal edge of the laminated sheets 11 and 13 therebetween and the sides 17d and 17e are positioned so as to sandwich the upper marginal edge of the lower laminated sheets 12 and 14 therebetween with edges 11a and 12a resting immediately adjacent the creases 18 and 19, respectively. The header means 17 may be secured to the upper marginal edges of the laminated sheets 11–13 and 12–14 by any suitable means. The header 17 is preferably formed of a fireproof material such as asbestos or paper treated with a suitable fireproof coating.

In addition to the above arrangement, and prior to the assembly of the package, the outer surfaces of foil sheets 11 and 12 are coated with a suitable epoxy material which is applied, preferably by a gravure method to the outer surfaces of the foil sheets 11 and 12. This epoxy or epoxy base coating acts to electrically insulate the foil sides 11 and 12 from the live elements of the toaster, thus preventing any harm to befall the package user.

To use the package, the header means 17 (shown in FIGURE 1) is gripped by the fingers, in the manner shown in FIGURE 1, with the sides 17b–17c, forming saddle 24, being pulled in the direction of arrow 21 and with the sides 17d–17e, forming saddle 24, being pulled in the direction o farrow 22. This causes the header means to be torn along the perforated line 20, separating into two separate saddle portions 23 and 24, which are arranged in inverted V-shaped fashion along the marginal edges 11a and 12a (see FIGURE 4a). With the saddle portions 23 and 24 being separated along the perforations 20, any additional force exerted upon the saddle portions causes the package to separate along the upper marginal edge, thus fracturing the seal provided between the upper dashed lines 16d and 16f, shown in FIGURE 4a. This causes the upper end of the package 10 to be substantially opened along the length of the upper marginal seal, in a manner shown in FIGURE 2. Separate saddles 17 of FIGURE 4b may be employed as an alternative to the perforated header 17 of FIGURE 4a.

The package is then gripped by the fingers along the header means and inserted into the opening 26 in toaster 25. Toaster 25 is provided with a plug-in cord 27, insertable into a wall socket, for the purpose of energizing the toaster. With the package 10 fully inserted into the toaster 25, in the manner shown in FIGURE 3, it can clearly be seen that the header means 17 extends above the upper surface of the toaster 25 so that the fingers of the user are not required to enter into the toaster in order to deposit the package 10 therein. In addition thereto, if the toaster 25 is not of the automatic pop-up type, the header means 17 may be conveniently grasped by the fingers to remove the package 10 from the toaster after undergoing a suitable heating period. The dimensions of the header means are sufficient to permit the user to firmly grasp the header means without touching the foil sides of the package so as to provide electrical isolation between the user and the live elements of the toaster. In addition to the above, the epoxy coating on the outer surfaces of foil sheets 11 and 12 act to electrically isolate the foil sheets 11 and 12 from the energized heating elements of the toaster to further electrically isolate the live elements of the toaster from the package user.

Upon removal of the package 10 from the toaster, the separate saddles 23 and 24 may be gripped and pulled apart in the directions shown by arrows 21 and 22 of FIGURE 1 so as to peel away the package from the heated contents. Use of the header means in this manner enables the user to safely handle the package without any danger of being burnt, since the foil package 10 absorbs a large amount of heat while in the toaster. Thus the header serves the additional function of facilitating the peeling away of the package from the heated contents.

Therefore it can be seen that the instant invention provides a novel package for sliced meats and the like, which package is readily adaptable for insertion into a toaster to permit the heating of the contents thereof. The foil package is provided with a sanitary wrapper to further enhance and preserve the quality of the food contained therein. The package is still further provided with a novel header means which serves the functions of electrically isolating the package from the user and acts as a means for opening the upper marginal seal of the package and permits handling of the package after the toasting operation, without any danger of the user being burnt. The outer surfaces of the foil package are coated with an epoxy which acts to electrically isolate the foil sides of the package from the live elements of the toaster into which the package is inserted. While the above description teaches a header means formed of a single continuous sheet perforated along a straight line, it should be understood that the header means may be modified by providing two separate saddle members not connected by a perforated edge, which may also be secured to the lamination sheets, in any suitable manner. The operation of such a modified header means being substantially the same as that shown in FIGURES 4a and 4b.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Package means for containing foodstuffs and adaptable for use in a conventional toaster comprising first and second sheets of foil of dimensions suitable for insertion into a toaster; said foil sheets being positioned against one another and having a marginal portion sealed to one another along three sides to form an opening for receiving food therein; a region along the fourth side of said package being sealed except for the marginal portion thereof to form first and second elongated tabs; first and second saddle means secured to said first and second tabs facilitating the opening of said package means along the fourth side; said saddle means each being formed of a flat sheet of non-conductive material to permit handling of said package to and from said toaster while isolating the user from the live elements of the toaster; said flat sheet being folded substantially in half to form a V-configuration; the halves of said sheets making contact with opposite sides of said tab.

2. Package means for containing foodstuffs and adaptable for use in a conventional toaster comprising first and second sheets of foil of dimensions suitable for insertion into a toaster; said foil sheets being positioned against one another and having a marginal portion sealed to one another along three sides to form an opening for receiving food therein; a region along the fourth side of said package being sealed except for the marginal portion thereof to form first and second elongated tabs; first and second saddle means secured to said first and second tabs facilitating the opening of said package means along the fourth side; said saddle means each being formed of a flat sheet of non-conductive material to permit handling of said package to and from said toaster while isolating the user from the live elements of the toaster; said saddle means comprising first and second elongated rectangular sheets folded substantially in half; each sheet being positioned over said first and second tabs respectively; said flat sheet being folded substantially in half to form a V-configuration; the halves of said sheets making contact with opposite sides of said tab.

3. Package means for containing foodstuffs and adaptable for use in a conventional toaster comprising first and second sheets of foil of dimensions suitable for insertion into a toaster; said foil sheets being positioned against one another and having a marginal portion sealed to one another along three sides to form an opening for receiving food therein; a region along the fourth side of said package being sealed except for the marginal portion thereof to form first and second elongated tabs; first and second saddle means secured to said first and second tabs facilitating the opening of said package means along the fourth side; said saddle means each being formed of a flat sheet of non-conductive material to permit handling of said package to and from said toaster while isolating the user from the live elements of the toaster; said saddle means facilitating the rupture of the seal along said fourth side to permit the escape of gases or vapor from the contents of said package upon heating thereof; said flat sheet being folded substantially in half to form a V-configuration; the halves of said sheets making contact with opposite sides of said tab; said first and second sheets being joined along adjacent sides to form a perforated fold therebetween.

4. Package means for containing foodstuffs and adaptable for use in a conventional toaster comprising first and second sheets of foil of dimensions suitable for insertion into a toaster; said foil sheets being positioned against one another and having a marginal portion sealed to one another along three sides to form an opening for receiving food therein; a region along the fourth side of said package being sealed except for the marginal portion thereof to form first and second elongated tabs; first and second saddle means secured to said first and second tabs facilitating the opening of said package means along the fourth side; said saddle means each being formed of a flat sheet of non-conductive material to permit handling of said package to and from said toaster while isolating the user from the live elements of the toaster; said flat sheet being folded substantially in half to form a V-configuration; the halves of said sheets making contact with opposite sides of said tab; said foil sheets being coated with a suitable epoxy for providing an insulating surface along the entire outer surface of said package.

5. Package means for containing foodstuffs and adaptable for use in a conventional toaster comprising first and second sheets of foil of dimensions suitable for insertion into a toaster; said foil sheets being positioned against one another and having a marginal portion sealed to one another along three sides to form an opening for receiving food therein; a region along the fourth side of said package being sealed except for the marginal portion thereof to form first and second elongated tabs; first and second saddle means secured to said first and second tabs facilitating the opening of said package means along the fourth side; said saddle means each being formed of a flat sheet of non-conductive material to permit handling of said package to and from said toaster while isolating the user from the live elements of the toaster; said flat sheet being folded substantially in half to form a V-configuration; the halves of said sheets making contact with opposite sides of said tab; first and second sanitary sheets positioned between said first and second foil sheets for preserving and insulating the contents thereof from said foil sheets.

References Cited by the Examiner

UNITED STATES PATENTS

| 1,217,818 | 2/17 | Peterson | 229—3.5 |
| 2,881,078 | 4/59 | Oritt | 99—171 |
| 2,902,396 | 9/59 | Reynolds | 229—3.5 |

FOREIGN PATENTS 320,289   10/29   Great Britain.

OTHER REFERENCES

Modern Plastics—Encyclopedia issue for 1959—September 1958, page 176.

FRANKLIN T. GARRETT, *Primary Examiner.*